(Model.)
W. H. MILLS.
GATE HOLDER.
No. 257,737. Patented May 9, 1882.
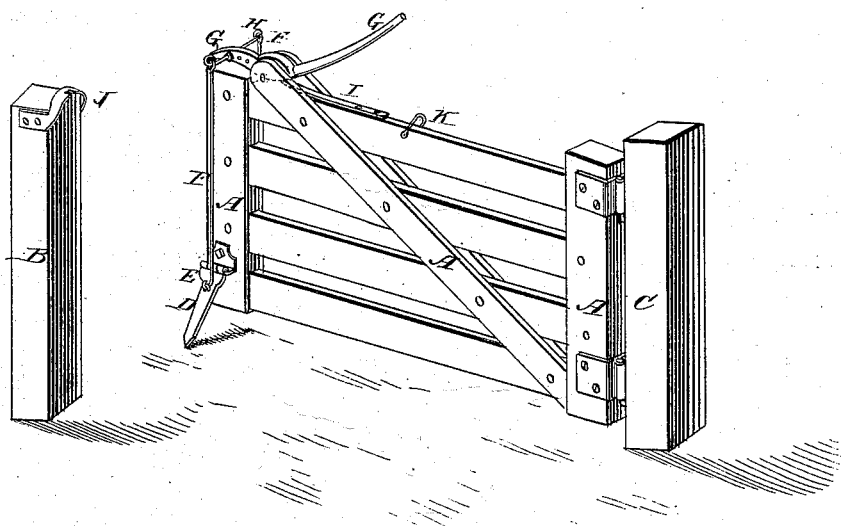
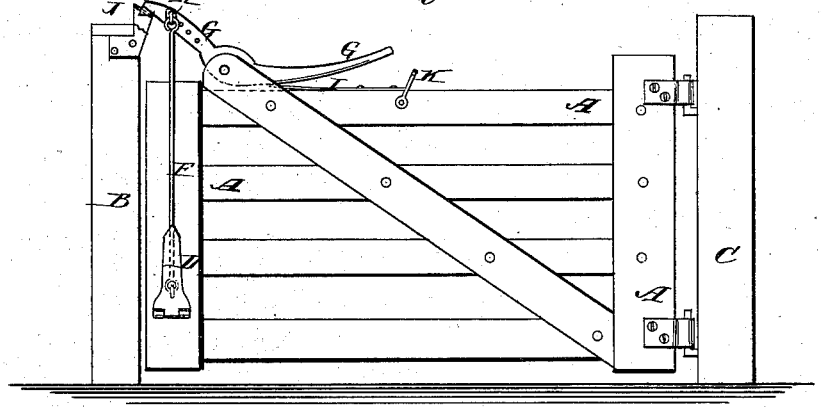
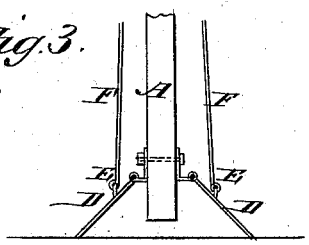
WITNESSES:
Francis McArdle
C. Sedgwick
INVENTOR:
W. H. Mills
BY Munn & Co
ATTORNEYS.

United States Patent Office.

WILLIAM H. MILLS, OF CLEAR CREEK, ILLINOIS.

GATE-HOLDER.

SPECIFICATION forming part of Letters Patent No. 257,737, dated May 9, 1882.

Application filed March 2, 1882. (Model.)

*To all whom it may concern:*

Be it known that I, WILLIAM H. MILLS, of Clear Creek, in the county of Putnam and State of Illinois, have invented a new and useful Improvement in Gate-Holders, of which the following is a full, clear, and exact description.

Reference is to be had to the accompanying drawings, forming part of this specification, in which similar letters of reference indicate corresponding parts in all the figures.

Figure 1 is a perspective view of a gate partly opened, to which my improvement has been applied. Fig. 2 is a side elevation of the same. Fig. 3 is an elevation of the lower part of the forward end of the gate.

The object of this invention is to provide a mechanism for holding gates securely in place when opened.

The invention consists in a gate-holder constructed with a hinged pawl, a connecting-rod, and a spring-pressed lever, whereby the gate will be held securely in place when opened, as will be hereinafter fully described.

A represents the gate. B is the front post, and C is the rear post.

To one or both sides of the lower part of the forward end of the gate A is hinged a pawl, D, in such a position that its lower end will rest upon the ground. The hinges of the pawls D are so formed that the pivots of the hinges will be at such a distance from the gate A that when the pawls D are turned up the free ends of the said pawls will come in contact with the said gate before the eyes or staples E, attached to the said pawls.

To the eyes E are attached the lower ends of the rods F, the upper ends of which are attached to the lever G, or to the ends of a short cross-rod, H, secured at its center to the said lever G. Several holes are formed in the lever G to receive the ends of the rods F or the cross-rod H, so that the point of attachment can be adjusted to give the proper movement to the pawls D. The lever G is pivoted to the projecting ends of the gate-braces, or to other suitable support attached to the gate. The rear end of the lever G is inclined or curved upward to allow the said lever to have the necessary movement to operate the pawls D.

To the gate A is attached a spring, I, to press the forward end of the lever G downward, and thus hold the pawls D against the ground. The forward end of the lever G can project to engage with a catch, J, attached to the post B, and serve as a latch for fastening the gate shut; or a separate latch can be used, if desired. With this construction the pawls D will hold the gate securely in place when opened.

K is a clevis or loop attached to the gate A in such a position that it can be swung over the rear end of the lever G to hold the pawls D away from the ground when opening and closing the gate.

I have shown and described my improvement as applied to a gate; but it can be used upon barn-doors and other large doors with equal facility and advantage.

Having thus fully described my invention, I claim as new and desire to secure by Letters Patent—

The combination, with the gate A, of the hinged pawls D, having eyes E on top, the rods F, the cross-rod H, the lever G, and the spring I, all arranged substantially as and for the purpose specified.

WILLIAM H. MILLS.

Witnesses:
REUBEN B. SMITH,
OSKER F. TAYLOR.